US008555834B2

(12) United States Patent
Cook et al.

(10) Patent No.: US 8,555,834 B2
(45) Date of Patent: Oct. 15, 2013

(54) DEVICE AND METHOD CONFIGURED TO CONTROL VALVE OPERATION IN A PISTON ENGINE

(75) Inventors: David Cook, Mountain View, CA (US); Dave Andre, Kirchheim unter Teck (DE); Sungbae Park, Huissen (NL); Aleksandar Kojic, Sunnyvale, CA (US); Hanho Song, Cupertino, CA (US); Nalin Chaturvedi, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 225 days.

(21) Appl. No.: 13/053,389

(22) Filed: Mar. 22, 2011

(65) Prior Publication Data

US 2012/0240887 A1   Sep. 27, 2012

(51) Int. Cl.
*F01L 1/34* (2006.01)
(52) U.S. Cl.
USPC .............. 123/90.15; 123/90.1; 123/90.23; 123/316; 123/311
(58) Field of Classification Search
USPC ............ 123/76, 90.15, 90.1, 90.23, 316, 311
See application file for complete search history.

(56) References Cited

U.S. PATENT DOCUMENTS

| | | | |
|---|---|---|---|
| 2,292,233 A | | 8/1942 | Lysholm |
| 4,424,790 A | | 1/1984 | Curtil |
| 4,945,867 A | | 8/1990 | Tanahashi et al. |
| 5,031,582 A | | 7/1991 | Kruger |
| 5,927,238 A | * | 7/1999 | Watson .................. 123/90.15 |
| 6,318,348 B1 | * | 11/2001 | Xu ........................ 123/568.14 |
| 6,321,715 B1 | * | 11/2001 | Dong ..................... 123/295 |
| 6,826,905 B2 | * | 12/2004 | Gui et al. ................ 60/295 |
| 7,146,966 B2 | * | 12/2006 | Nakamura ............... 123/481 |
| 7,280,909 B2 | * | 10/2007 | Lewis et al. ............. 701/113 |
| 7,334,549 B2 | * | 2/2008 | Lewis et al. ............. 123/90.11 |
| 7,490,001 B2 | * | 2/2009 | Izelfanane .............. 701/105 |
| 7,530,343 B2 | * | 5/2009 | Megli et al. ............. 123/322 |
| 7,628,136 B2 | * | 12/2009 | Lyon ..................... 123/198 F |
| 2009/0183699 A1 | * | 7/2009 | Sturman ................. 123/63 |
| 2009/0277434 A1 | * | 11/2009 | Surnilla ................. 123/65 R |

FOREIGN PATENT DOCUMENTS

| | | |
|---|---|---|
| DE | 3926631 A1 | 2/1990 |
| DE | 4012500 A1 | 10/1990 |
| DE | 10359087 B3 | 5/2005 |
| GB | 534161 A | 2/1941 |

OTHER PUBLICATIONS

Invitation to Pay Additional Fees and, Where Applicable, Protest Fee in corresponding PCT application (i.e., PCT/US2012/029574), mailed Jul. 6, 2012 (5 pages).

(Continued)

*Primary Examiner* — Noah Kamen
*Assistant Examiner* — Long T Tran
(74) *Attorney, Agent, or Firm* — Maginot, Moore & Beck

(57) ABSTRACT

A method of operating an internal combustion engine includes moving an exhaust valve to a first open position to enable an exhaust product to flow through an exhaust port of the internal combustion engine. The method also includes maintaining the exhaust valve at the first open position for a predetermined time period. The method also includes moving an intake valve to a second open position during the predetermined time period to enable an intake product to flow through an intake port of the internal combustion engine. Additionally, the method includes preventing at least a portion of the intake product from flowing through the exhaust port during the predetermined time period with a first blocking member and a second blocking member.

20 Claims, 12 Drawing Sheets

(56) References Cited

OTHER PUBLICATIONS

John B. Heywood, Internal Combustion Engine Fundamentals, 1988, pp. 346-349, McGraw-Hill.

International Search Report and Written Opinion in corresponding PCT application (i.e., PCT/US2012/029574), completed on Jul. 2, 2012 (24 pages).

* cited by examiner

DEVICE AND METHOD CONFIGURED TO CONTROL VALVE OPERATION IN A PISTON ENGINE

FIELD

The present disclosure relates generally to internal combustion engines and, in particular, to controlling the valve operation of an internal combustion piston engine.

BACKGROUND

Internal combustion engines burn fuel to generate a drive torque, which may power numerous types of devices including handheld power tools, automobiles, and many other machines. One type of internal combustion engine is a reciprocating engine or, as more commonly termed, a piston engine.

A typical piston engine includes an engine block, one or more pistons, a crankshaft, a valve assembly, and a fuel delivery system. The engine block defines one or more cylindrical cavities, which are referred to simply as cylinders. Some piston engines include only one cylinder, while other piston engines include eight or more cylinders. For simplicity, this background describes a piston engine having only one cylinder. The piston is a generally cylindrical unit that is positioned for movement within the cylinder. A tie rod connects a bottom side of the piston to the crankshaft. A portion of the cylinder located above a top side of the piston is referred to as a combustion chamber. The valve assembly is connected to the engine block for fluid communication with the cylinder and, in particular, with the combustion chamber. The fuel delivery system supplies the combustion chamber, either directly or indirectly, with a supply of fuel. Piston engines may include additional components, systems, and subsystems as known to those of ordinary skill in the art.

In operation, the exemplary piston engine generates a drive torque by periodically burning a fuel within the combustion chamber. Exemplary fuels include, but are not limited to, gasoline, diesel, ethanol, and alcohol. Burning the fuel within the combustion chamber generates a force, which causes the piston to move within the cylinder. Movement of the piston causes the crankshaft to rotate, thereby generating the rotational drive torque of the engine. The exhaust by-products of the burnt fuel are expelled from the combustion chamber through the valve assembly.

Most piston engines generate the drive torque with either a two-stroke operation cycle or a four-stroke operation cycle. A "stroke" of the piston refers to the piston moving from near one end of the cylinder to near the opposite end of the cylinder. For example, in an engine having a vertically oriented cylinder, a stroke occurs when the piston slides from near the top of the cylinder to near the bottom of the cylinder. A stroke also occurs when the piston slides from near the bottom of the cylinder to near the top of the cylinder.

The four-stroke operation cycle sequentially performs four engine operations over the course of four strokes of the piston. The strokes associated with these engine operations are commonly termed the intake stroke, the compression stroke, the power stroke, and the exhaust stroke. During the intake stroke, the piston moves away from the valve assembly and draws fresh air into the combustion chamber. Also, during the intake stroke fuel enters the combustion chamber. Next, during the compression stroke, the piston moves toward the valve assembly and compresses the fresh air and fuel mixture within the combustion chamber. During the power stroke, the fuel within the combustion chamber is burned to generate rapidly expanding gases, which are referred to as exhaust by-products. The exhaust by-products force the piston away from the valve assembly. Next, during the exhaust stroke, the piston moves toward the value assembly, and the valve assembly evacuates the exhaust by-products from the combustion chamber. A piston engine operating with the four-stroke operation cycle (referred to as a four-stroke engine) sequentially repeats these strokes very rapidly to generate the crankshaft drive torque.

Piston engines operating with a two-stroke operation cycle perform the four engine operations described above over the course of two strokes of the piston. The strokes associated with these engine operations are commonly called a combination intake and compression stroke and a combination power and exhaust stroke. During the combination intake and compression stroke, the piston moves toward the valve assembly to draw fresh air into the combustion chamber and to compress the fresh air and fuel within the combustion chamber. Next, during the power and exhaust stroke, the fuel within the combustion chamber is burned, which generates exhaust by-products and causes the piston to move away from the valve assembly. As the piston moves away from the valve assembly the exhaust by-products are evacuated from the combustion chamber. A piston engine operating with the two-stroke operation cycle (referred to as a two-stroke engine) sequentially repeats these strokes very rapidly to generate the crankshaft drive torque.

Both two-stroke and four-stroke engines may exhibit a process referred to as short circuiting. It is typically desirable for two-stroke and four-stroke engines to evacuate completely the exhaust by-products from the combustion chamber without allowing any portion of the fresh air and/or unburned fuel to be evacuated from the combustion chamber with the exhaust by-products. During short circuiting, however, a portion of the fuel and/or fresh air is evacuated from the cylinder with the exhaust by-products. The fuel that is evacuated from the combustion chamber without being burned does not contribute to the generation of the drive torque. Accordingly, short circuiting reduces the fuel efficiency of an internal combustion piston engine. Therefore, further developments in the area of internal combustion piston engines are desirable.

SUMMARY

In at least one embodiment, a method of operating an internal combustion engine includes moving an exhaust valve to a first open position to enable an exhaust product to flow through an exhaust port of the internal combustion engine. The method also includes maintaining the exhaust valve at the first open position for a predetermined time period. Additionally, the method includes moving an intake valve to a second open position during the predetermined time period to enable an intake product to flow through an intake port of the internal combustion engine.

In at least one other embodiment, an internal combustion engine includes an exhaust valve, an intake valve, a first blocking member, and a valve controller. The exhaust valve is configured to move to a first open position to enable an exhaust product to flow through an exhaust port of the internal combustion engine. The intake valve is configured to move to a second open position to enable an intake product to flow through an intake port of the internal combustion engine. The first blocking member is configured to prevent at least a portion of the intake product from flowing through the exhaust port. The valve controller is configured (i) to maintain the exhaust valve at the first open position for a predetermined time period and (ii) to move the intake valve to the second open position during the predetermined time period.

In yet another embodiment, a method of operating an internal combustion engine includes operating the internal combustion engine in a four-stroke mode with a first valve positioning sequence. The method also includes adjusting a selection member to operate the internal combustion engine in a two-stroke mode. Additionally, the method includes operating the internal combustion engine in the two-stroke mode with a second valve positioning sequence.

BRIEF DESCRIPTION OF THE FIGURES

Features of the present disclosure will become apparent to those of ordinary skill in the art to which this device and method pertains from the following description with reference to the figures, in which.

DETAILED DESCRIPTION

For the purpose of promoting an understanding of the principles of the device and method described herein, reference will now be made to the embodiments illustrated in the figures and described in the following written specification. It is understood that no limitation to the scope of the device and method is thereby intended. It is further understood that the device and method includes any alterations and modifications to the illustrated embodiments and includes further applications of the principles of the device and method as would normally occur to one of ordinary skill in the art to which this device and method pertains.

Figure 1:
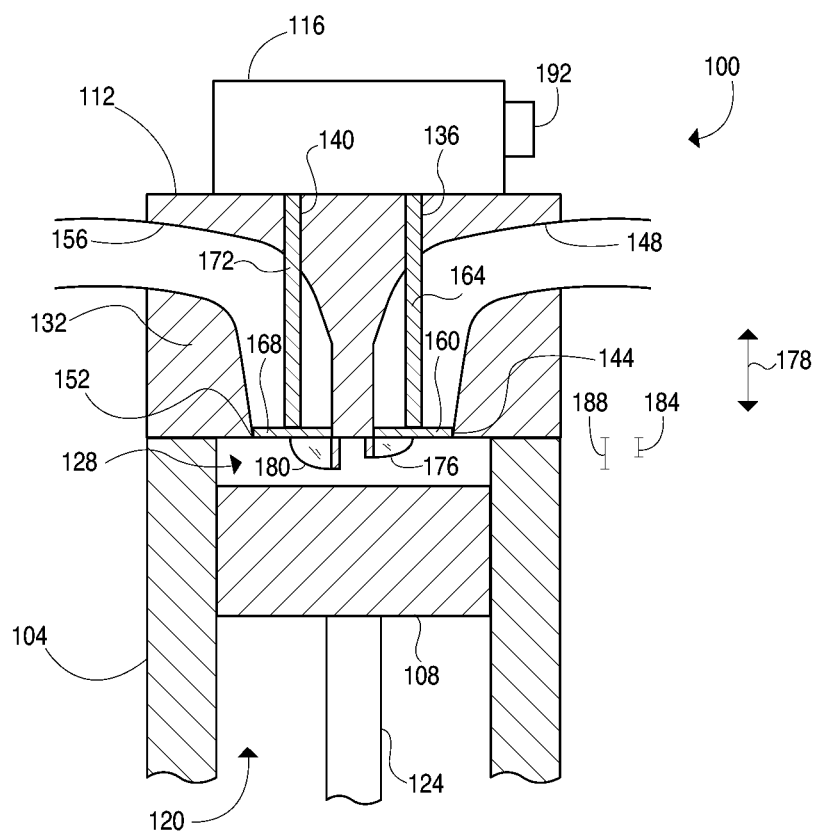
FIG. 1 is a side cross sectional view of a portion of an internal combustion engine.

As shown in FIG. 1, an internal combustion engine 100 includes an engine block 104, a piston 108, a cylinder head 112, and a valve controller 116. The valve controller 116 may be configured to operate an intake valve 136 and an exhaust valve 140 of the cylinder head 112 in a manner that reduces or eliminates combustion chamber short circuiting. The structure of the engine 100 and a method of operating the engine are described below.

The engine block 104 defines a cylindrical cavity, referred to as a cylinder 120. Although the engine block 104 is shown as defining only one cylinder 120, the engine block may define any number of cylinders. For example, the engine block 104 may define between one and eight or more cylinders. A combustion chamber 128 portion of the cylinder 120 is defined by a top side of the piston 108 and a bottom side of the cylinder head 112. The engine block 104 is formed from materials conventionally used to form known engine blocks. For example, the engine block 104 may be formed from aluminum or cast iron.

The piston 108 of the internal combustion engine 100 is slidably received by the cylinder 120. The piston 108 is a generally cylindrical unit having a diameter slightly smaller than a diameter of the cylinder 120 to enable the piston to enter the cylinder. The piston 108 is formed from aluminum; however, in other embodiments the piston may be formed from other materials conventionally used to form pistons, such as cast iron. A tie rod 124, or other connection member, connects a bottom side of the piston 108 to a crankshaft (not shown) of the engine 100.

With continued reference to FIG. 1, the cylinder head 112 is connected to the engine block 104 and includes a body 132, an intake valve 136, and an exhaust valve 140. The body 132 of the cylinder head 112 defines an intake port 144, which is associated with the intake valve 136 and terminates an intake channel 148. Additionally, the body 132 of the cylinder head 112 defines an exhaust port 152, which is associated with the exhaust valve 140 and terminates an exhaust channel 156. The body 132 of the cylinder head 112 is formed from aluminum. In other embodiments, however, the body 132 may be formed from other materials conventionally used to form cylinder heads including cast iron and steel.

Figure 2A:
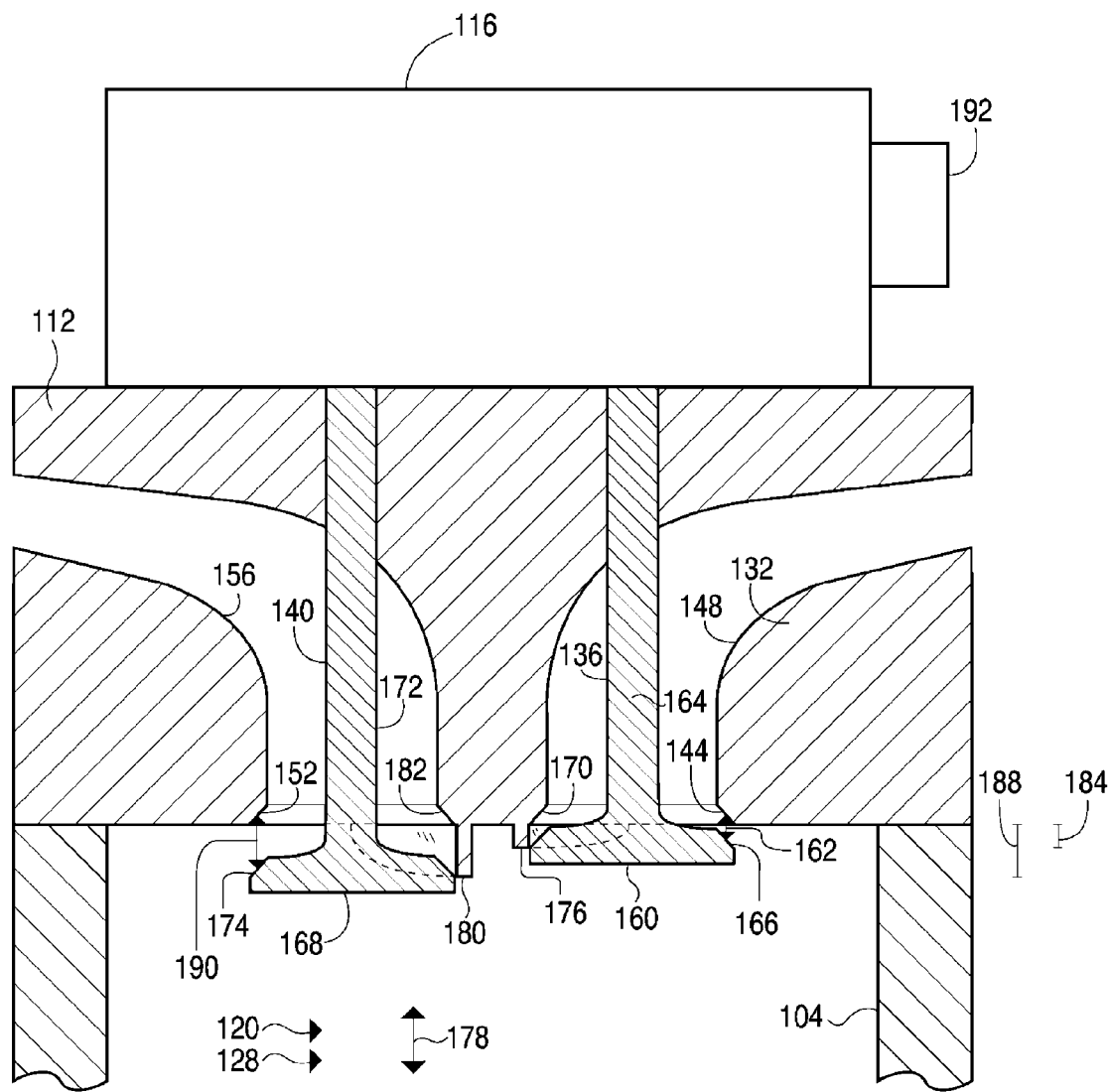
FIG. 2A is a side cross sectional view of a cylinder head of the internal combustion engine of FIG. 1.

As shown in FIG. 2A, the intake valve 136 includes an intake valve head 160 connected to an intake shaft 164. The intake shaft 164 extends through a portion of the body 132 and is received by the valve controller 116 (FIG. 1). The intake valve head 160 has an outer periphery, which corresponds to the periphery of the intake port 144. As shown in the embodiment of FIG. 2A, the outer periphery of the intake valve head 160 is circular. The intake valve 136 may be moved to a closed position, which fluidly decouples the intake channel 148 from the cylinder 120. When the valve controller 116 moves the intake valve 136 to the closed position, an intake seat surface 166 of the intake valve head 160 becomes seated against an intake port surface 170 of the intake port 144. In the embodiment of FIG. 2A, the intake seat surface 166 and the intake port surface 170 are generally disc or ring-shaped surfaces. The valve controller 116 may move the intake valve 136 to an open position in which the intake channel 148 is fluidly coupled to the cylinder 120. When the valve controller 116 positions the intake valve 136 in the open position, the intake seat surface 166 is separated from the intake port surface 170 of the intake port 144. Although the cylinder head 112 is shown with one intake valve 136, other embodiments of the cylinder head may include two or more intake valves.

With continued reference to FIG. 2A, the exhaust valve 140 includes an exhaust valve head 168 connected to an exhaust shaft 172. The exhaust shaft 172 extends through a portion of the body 132 and is received by the valve controller 116. The exhaust valve head 168 has an outer periphery, which corresponds to the periphery of the exhaust port 152. The exhaust valve 140 may be moved to a closed position which fluidly decouples the exhaust channel 156 from the cylinder 120. When the valve controller 116 moves the exhaust valve 140 to the closed position, an exhaust seat surface 174 of the exhaust valve head 168 becomes seated against an exhaust port surface 182 of the exhaust port 152. In the embodiment of FIG. 2A, the exhaust seat surface 174 and the exhaust port surface 182 are generally disc or ring-shaped surfaces. The exhaust valve 140 may also be moved to an open position in which the exhaust channel 156 is fluidly coupled to the cylinder 120. When the valve controller 116 moves the exhaust valve 140 to the open position the exhaust seat surface 174 is separated from the exhaust port surface 182. The cylinder head 112 is shown with only one exhaust valve 140; however, in other embodiments, the cylinder head may include more than one exhaust valve.

The valve controller 116 may separate the intake valve 136 and the exhaust valve 140 from their respective ports 144, 152 by a distance that is referred to as a "lift" of the valves. As shown in FIG. 2A, the lift 162 of the intake valve 136 is the distance between the intake seat surface 166 of the intake valve head 160 and the intake port surface 170 of the intake port 144. Similarly, the lift 190 of the exhaust valve 140 is the distance between the exhaust seat surface 174 and the exhaust port surface 182. The lift 162 of the intake valve 136 and the lift 190 of the exhaust valve 140 are measured in a direction parallel to the direction of valve movement, and depending on the orientation of the engine 100, the lift may or may not be measured in a vertical direction. The direction of valve movement is represented by the line 178 in FIG. 2A. An exemplary lift of the intake valve 136 in the closed position is zero, and an exemplary lift of the intake valve in an open position is approximately five millimeters.

With reference again to FIG. 1, the cylinder head 112 further includes a first and a second blocking member shown as an intake skirt 176 and an exhaust skirt 180. The skirts 176, 180 may be formed from the same material as the body 132 of the cylinder head 112, or the skirts may be formed from any material that is suitable for placement within the combustion chamber 128 of the engine 100 without becoming deformed or otherwise damaged. The skirts 176, 180 may be connected to the body 132 with fasteners, by welding, or through a brazing process. The skirts 176, 180 may also be machined from the body 132 of the cylinder head 112 such that the body and the skirts are formed from the same piece of material. The skirts 176, 180 may be described as being connected to a ceiling of the combustion chamber 128.

Figure 2B:
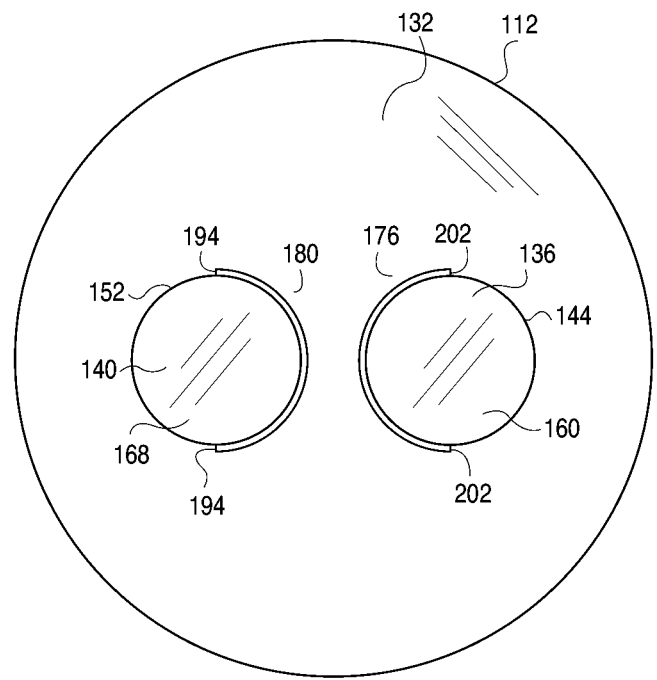
FIG. 2B is a bottom view of the cylinder head of the internal combustion engine of FIG. 1.

As shown in FIGS. 2A and 2B, the intake skirt 176 is positioned around at least a portion of the periphery of the intake port 144, such that the intake skirt has a substantially arcuate shape. In particular, the intake skirt 176 is connected to the portion of the body 132 between the intake port 144 and the exhaust port 152 and is positioned around approximately half of the periphery of the intake port 144. The intake skirt 176 has a height that is measured as the distance the intake skirt extends from the body 132, as represented by the line 184 (FIG. 2A). The distance that the intake skirt 176 extends from the body 132 decreases toward the lateral ends 202 (FIG. 2B) of the intake skirt. Therefore, the "height" of the intake skirt 176 may be determined as a maximum distance that the intake skirt extends from the body 132 as measured in a direction parallel to the direction of valve movement 178, and is not necessarily a vertical measurement. In another embodiment, the intake skirt 176 extends from the body 132 by an approximately constant distance.

The exhaust skirt 180 is similar in structure to the intake skirt 176. The exhaust skirt 180 extends along at least a portion of the periphery of the exhaust port 152, such that the exhaust skirt has a substantially arcuate shape. In particular, the exhaust skirt 180 is connected to the portion of the body 132 between the intake port 144 and the exhaust port 152 and is positioned around approximately half of the periphery of the exhaust port. The exhaust skirt 180 has a height that is measured as the distance the exhaust skirt extends from the body 132, as represented by the line 188 (FIG. 2A). The height of the exhaust skirt 180 is shown as being greater than the height of the intake skirt 176. The distance that the exhaust skirt 180 extends from the body 132 decreases toward the lateral ends 194 (FIG. 2B) of the exhaust skirt. Therefore, the height of the exhaust skirt 180 may be determined as a maximum distance the exhaust skirt extends from the body 132 as measured in a direction parallel to the direction of valve movement 178 (FIG. 2A). In another embodiment, the exhaust skirt 180 extends from the body 132 by an approximately constant distance.

The engine 100 is configured to receive an intake product via a fuel delivery system (not shown). Exemplary fuel delivery systems include, but are not limited to, direct fuel injection systems, port fuel injection systems, and carbureted fuel delivery systems. In a direct fuel injection system fuel is ejected directly into the combustion chamber 128 without passing through the intake port 144. Thus, in a direct fuel injection system an intake stream (represented by dashed arrow 196 in FIGS. 5 and 6) of fresh air flows through the intake port 144. In a port fuel injection system and also in a carbureted system an intake stream 196 of fuel and air flows through the intake port 144. In each type of fuel delivery system, the pressure of the intake stream 196 entering the combustion chamber 128 through the intake port 144 may be greater than the pressure within the exhaust channel 156. The increased pressure of the intake stream 196 may be achieved with a forced induction device, such as a super charger or a turbo charger (neither of which are shown in the figures), among other devices known to those of ordinary skill in the art.

With reference again to FIG. 1, the valve controller 116 is connected to the body 132 of the cylinder head 112. The valve controller 116 is configured to control independently the lift of the intake valve 136 and the lift of the exhaust valve 140. In particular, the valve controller 116 may maintain the intake valve head 160 at a particular lift for a predetermined time period. Similarly, the valve controller 116 may maintain the exhaust valve head 168 at a particular lift for a predetermined time period. The valve controller 116 may maintain the lift of the intake valve 136 and the lift of the exhaust valve 140 with mechanical elements or with a combination of the electrical and mechanical elements. To this end, the valve controller 116 may be formed from any known valve controller apparatus such as an electro-hydraulic engine valve actuation system ("EHVS"), a variable valve actuation system ("VVA"), or a cam phaser valve control system.

The valve controller 116 may include a selection member, shown as an actuator 192 in FIG. 1, for selecting a particular valve positioning sequence from multiple available valve positioning sequences. The actuator 192 is an electronically-controlled switch; however, in other embodiments, the actuator may be a manually-controlled switch or any other type of selector assembly.

Figure 2C:
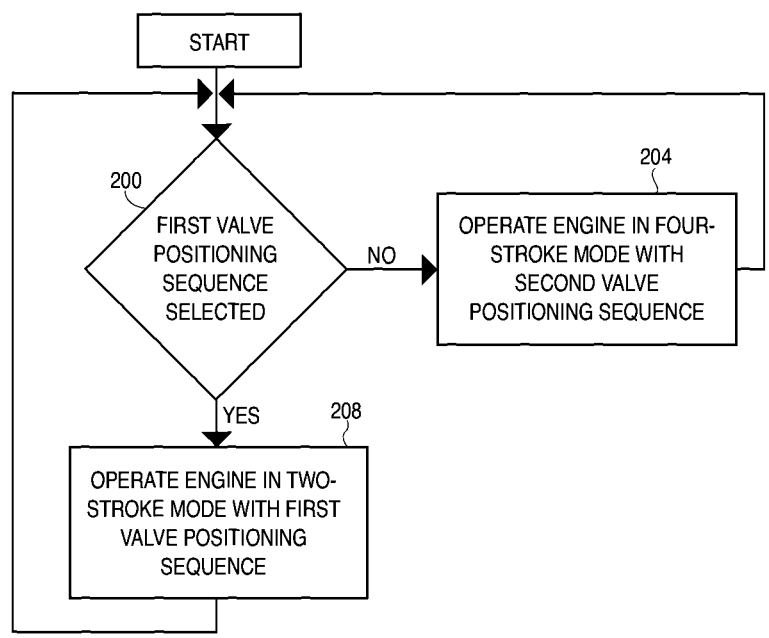
FIG. 2C is a flowchart illustrating an exemplary method of operating the internal combustion engine of FIG. 1.

As shown by the flowchart of FIG. 2C, the valve controller 116 enables the internal combustion engine 100 to be operated as a two-stroke engine when a first valve positioning sequence is selected or as a four-stroke engine when a second valve positioning sequence is selected. In block 200, the actuator 192 is used to select a two-stroke or a four-stroke valve positioning sequence. In block 204, when the valve controller 116 configures the engine 100 to operate in the four-stroke mode, the valve controller implements a valve positioning sequence, which enables the engine to execute the intake, compression, power, and exhaust strokes. In particular, during the intake stroke the valve controller 116 opens the intake valve 136 and closes the exhaust valve 140. During the compression stroke and the power stroke the valve controller 116 closes both the intake valve 136 and the exhaust valve 140. During the exhaust stroke the valve controller 116 opens the exhaust valve 140 and closes the intake valve 136. The valve controller 116, however, is capable of deviating from the above-described valve positioning sequence when operated in the four-stroke mode, such that the valve controller may implement any known valve positioning sequence used to operate an engine in the four-stroke mode.

In block 208, when the valve controller 116 configures the engine 100 to operate in the two-stroke mode, the valve controller implements a different valve positioning sequence, which enables the engine to execute the combined intake and compression stroke and the combined power and exhaust stroke (or any other valve positioning sequence used to operate a two-stroke engine). When operated in the two-stroke mode the engine 100 may generate approximately twice as much torque and power as when operated in the four-stroke mode.

Figure 3:
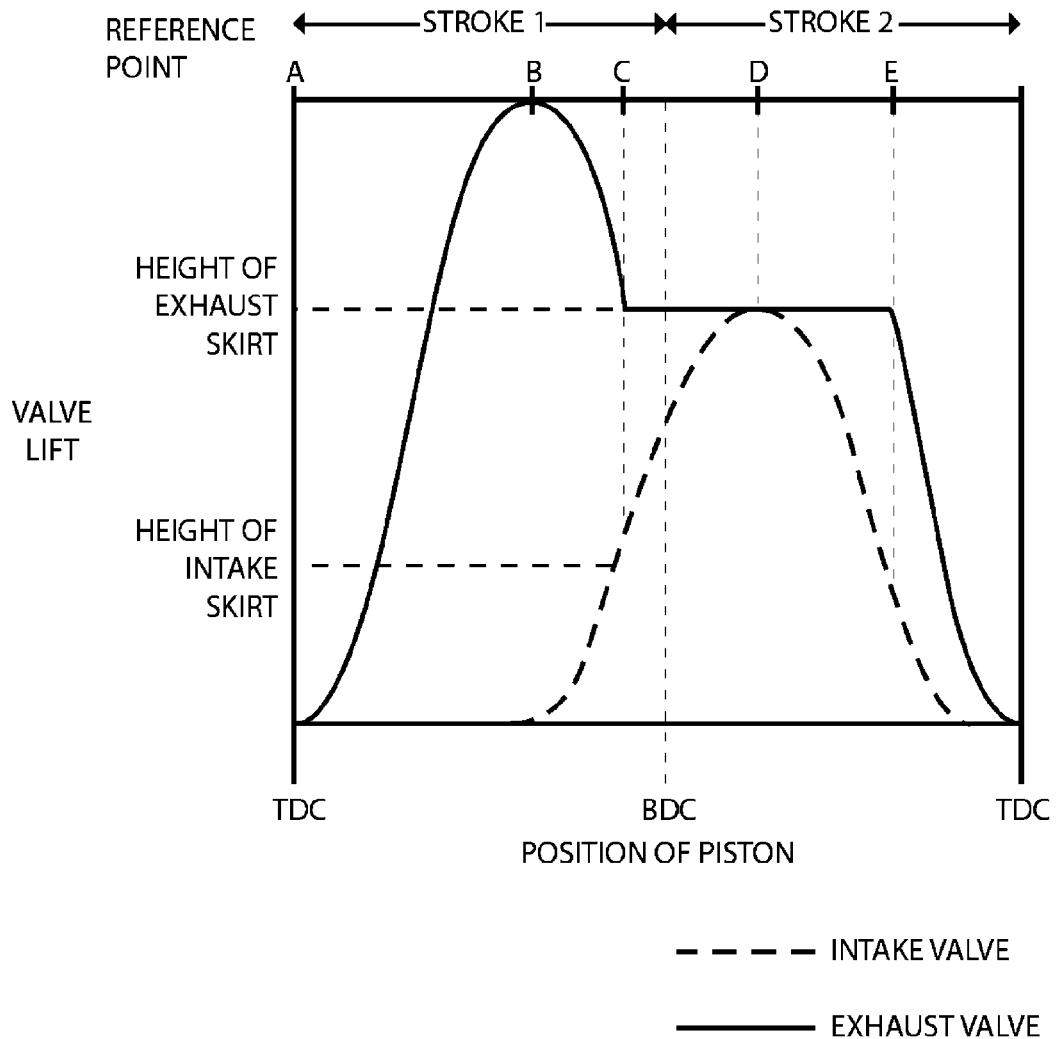
FIG. 3 is graph showing an exemplary two-stroke valve positioning sequence of the internal combustion engine of FIG. 1.

The valve controller 116 may implement the valve positioning sequence shown in FIG. 3 when the engine 100 is configured in the two-stroke mode. The chart of FIG. 3 illustrates the lift of the intake valve 136 and the lift of the exhaust valve 140 over the course of two strokes of the piston 108. In particular, at the leftmost edge of the chart the piston 108 is positioned nearest to the body 132 of the cylinder head 112 in a position referred to as top dead center ("TDC"). At the horizontal midpoint of the chart the piston 108 is positioned at a point farthest from the body 132 in a position referred to as bottom dead center ("BDC"). At the rightmost edge of the chart the piston 108 is positioned again at TDC. Also shown in FIG. 3 is the height of the intake skirt 176 and the exhaust skirt 180 in relation to the lift of the intake valve 136 and the exhaust valve 140. The valve positioning sequence shown in FIG. 3 will be described in further detail below with reference to accompanying FIGS. 1, 4, 5, and 6. The relative heights of the intake skirt 176 and the exhaust skirt 180 may, in at least some embodiments, be specific to a particular engine 100 design. In the embodiment of FIG. 3, the exhaust skirt 180 has a height that is greater than the height of the intake skirt 176; however, in another embodiment, the exhaust skirt has a height that is less than or equal to the intake skirt. Additionally, the valve positioning sequence shown in FIG. 3 is an exemplary positioning sequence. The valve controller 116 may position independently the lift of the intake valve 136 and the exhaust valve 140 depending on the state of the engine 100. For example, the valve controller 116 may configure the exhaust valve 140 to open earlier than shown in FIG. 3 when the engine 100 is being operated above a particular engine speed.

Figure 4:
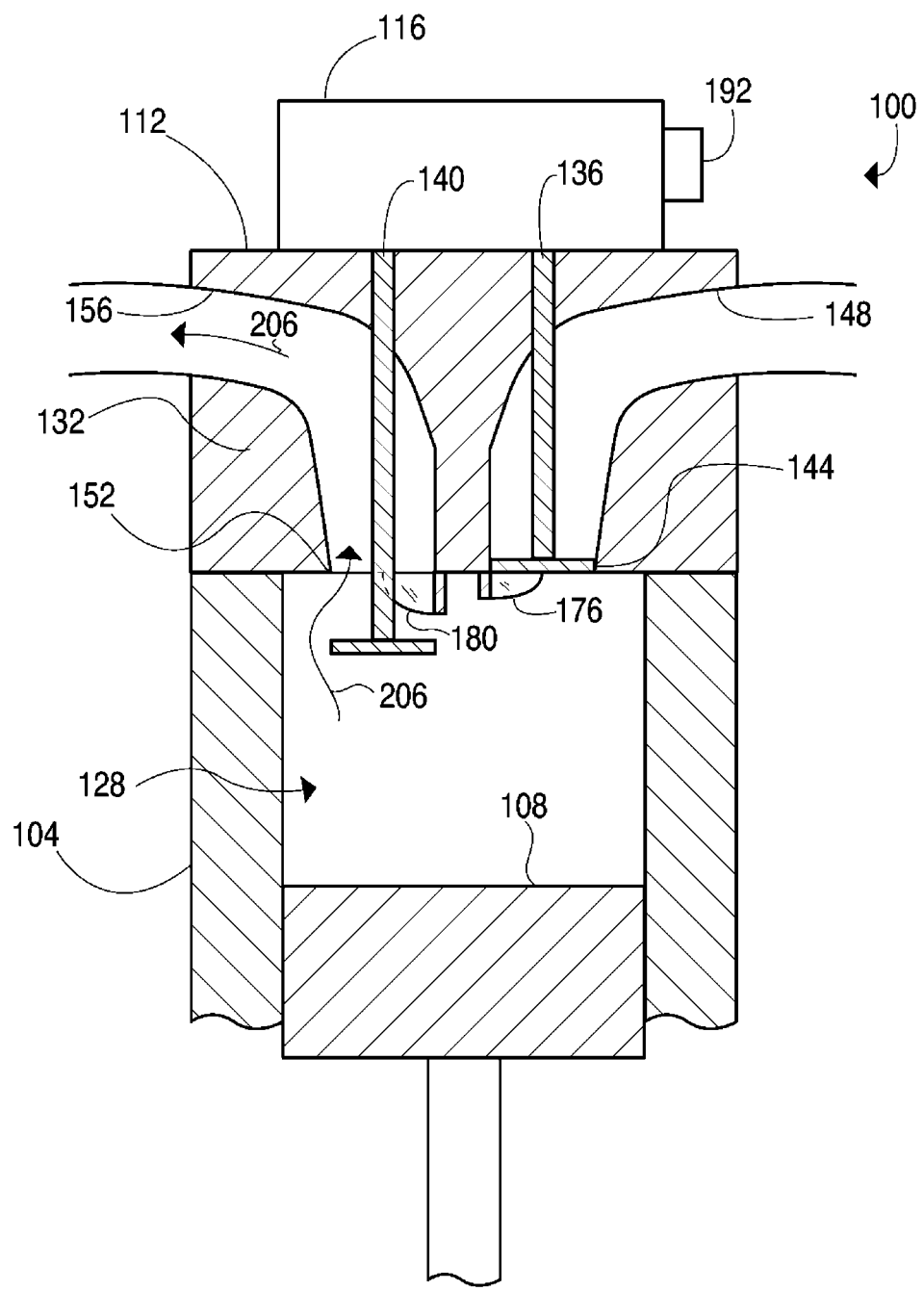
FIG. 4 is a side cross sectional view of the internal combustion engine of FIG. 1 shown with the exhaust valve in an open position and the intake valve in a closed position.

To begin the two-stroke mode valve positioning sequence, the piston 108 is positioned at TDC (as shown in FIG. 1) and the intake valve 136 and the exhaust valve 140 are closed (zero lift), as illustrated at reference point "A" in FIG. 3. At approximately this time the fuel within the combustion chamber is burned. The burnt fuel generates a force, which moves the piston 108 away from the body 132. After the piston 108 begins moving toward the BDC position, the valve controller 116 opens the exhaust valve 140 (i.e. moves the exhaust valve toward an open position) with an increasing lift to enable the exhaust products to evacuate the combustion chamber 128 through the exhaust port 152. As illustrated at reference point "B" of FIG. 3, the exhaust valve 140 reaches a position of maximum lift (as shown in FIG. 4), which exceeds the height of the exhaust skirt 180, before the piston 108 reaches the BDC position. As also shown in FIG. 4, the solid arrows 206 illustrate a path taken by exhaust products as they are evacuated from the combustion chamber 128 through the exhaust port 152.

Figure 5:
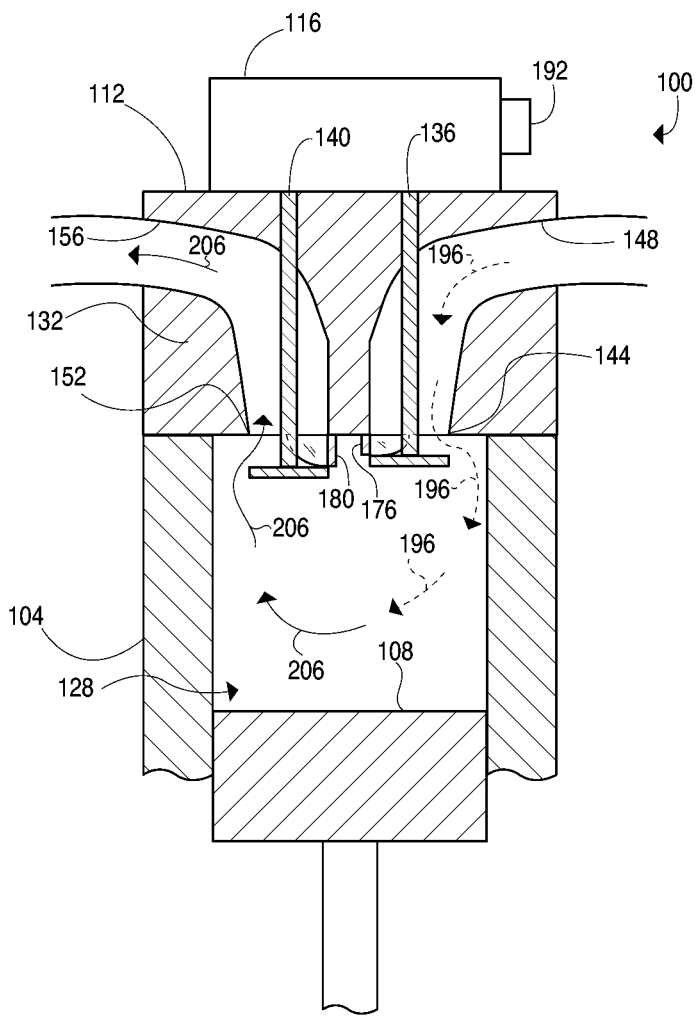
FIG. 5 is a side cross sectional view of the internal combustion engine of FIG. 1 shown with the exhaust valve in an open position and the intake valve in an open position.

In response to the exhaust valve 140 reaching the position of maximum lift (reference point "B" of FIG. 3 and illustrated in FIG. 4) the valve controller 116 opens the intake valve 136 and reduces the lift of the exhaust valve. As shown in FIG. 5 and at reference point "C" of FIG. 3, before the piston reaches the BDC position the lift of the exhaust valve 140 is substantially equal to the height of the exhaust skirt 180 and the lift of the intake valve 136 is substantially equal to the height of the intake skirt 176. As used herein, "heights" that are "substantially equal" have a height differential less than two millimeters. Opening of the intake valve 136 enables the intake stream (fresh air only for a direct injection system or fresh air and fuel for a port injection system), to enter the combustion chamber 128 through the intake port 144 as shown by the dashed arrow 196 of FIGS. 5 and 6. In this example, the pressure of the intake stream is greater than the pressure within the exhaust channel 156.

Figure 6:
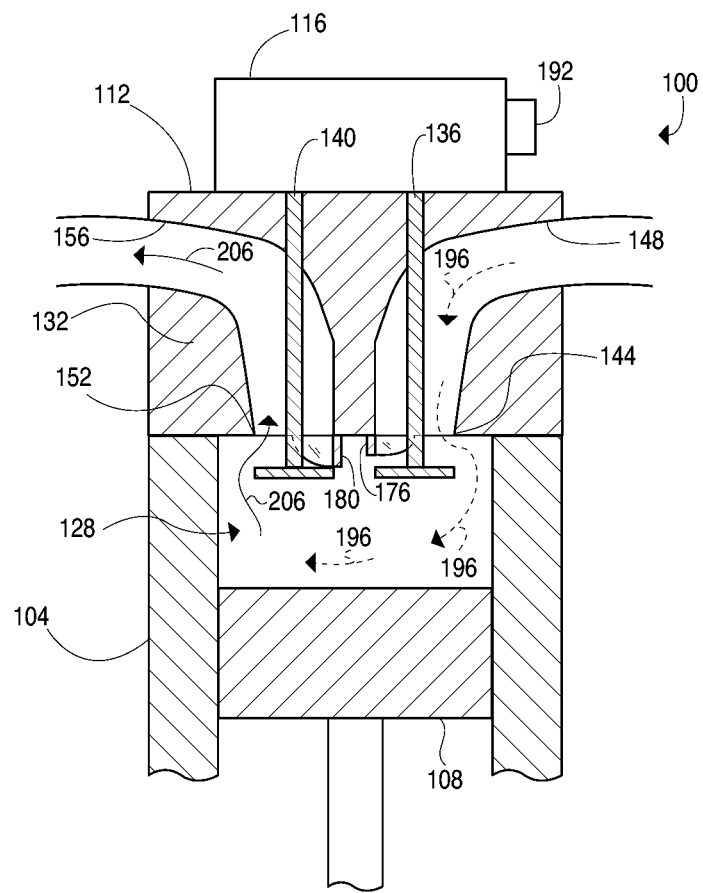
FIG. 6 is a side cross sectional view of the internal combustion engine of FIG. 1 shown with the exhaust valve in an open position and the intake valve in an open position.

Next, the valve controller 116 maintains the lift of the exhaust valve 140 at approximately the height of the exhaust skirt 180 for a predetermined time period as shown by the horizontal portion of the exhaust valve position between the reference points C and E of FIG. 3. The valve controller 116 moves the intake valve 136 toward an open position before the predetermined time period. During the predetermined time period the piston 108 reaches the BDC position and then starts to move toward the TDC position. As shown in FIG. 6 and at reference point D of FIG. 3, the lift of the intake valve 136 is substantially equal to the height of the exhaust skirt 180 and is substantially equal to the lift of the exhaust valve 140. In FIG. 6, the intake stream 196 has evacuated all/most of the exhaust by-products from the combustion chamber 128. Accordingly, the valve positioning sequence of FIG. 3 effectively scavenges the exhaust by-product from the combustion chamber 128. Next, and still during the predetermined time period (after reference point D of FIG. 3), the valve controller 116 decreases the lift of the intake valve 136. At the conclusion of the predetermined time period the valve controller 116 starts reducing the lift of the exhaust valve 140, such that when the piston reaches the TDC position, both the intake valve 136 and the exhaust valve are moved to their closed position. Upon reaching the TDC position again, the fuel within the combustion chamber is burned and the valve positioning sequence illustrated in FIG. 3 is repeated.

The intake skirt 176 and the exhaust skirt 180 reduce the amount of short circuiting exhibited by the engine 100 when the engine is operated in the two-stroke and the four-stroke modes. As described above, short circuiting occurs when fresh air and/or unburned fuel (represented by the intake stream 196 in FIGS. 5 and 6) exit the combustion chamber 128 through the exhaust port 152. Specifically, in the case of some direct fuel injection systems only fresh air exits the combustion chamber 128 during short circuiting, and in the case of some port fuel injection systems and some carbureted systems both unburned fuel and fresh air exit the combustion chamber during short circuiting. There are many variations of fuel delivery systems and for at least this reason some direct fuel injection systems may exhaust both fresh air and unburned fuel during short circuiting, and some port fuel injection and some carbureted systems may exhaust only unburned fuel during short circuiting.

The valve controller 116 introduces the condition in which short circuiting may occur by opening the intake valve 136 and the exhaust valve 140 simultaneously in a process referred to as positive valve overlap. Specifically, the intake valve 136 and the exhaust valve 140 may be open simultaneously in the four-stroke mode during the transition from the exhaust stroke to the intake stroke. During the two-stroke mode, as shown by FIG. 2, the intake valve 136 and the exhaust valve 140 are open simultaneously during portions of the first and the second strokes. In general, the fresh air and/or unburned fuel, which exit the combustion chamber 128 during short circuiting, do not contribute to the generation of the drive torque. Accordingly, it is generally desirable to reduce short circuiting.

The intake skirt 176 reduces short circuiting by controlling the intake stream, such that fresh air and unburned fuel (arrows 196) flow away from the exhaust port 152 as the intake stream enters the combustion chamber 128 through the intake port 144. As shown in FIG. 5, the intake skirt 176 is positioned to contact the side of the intake valve 136 nearest to the exhaust port 152. The contact between the intake valve 136 and the intake skirt 176 prevents the intake stream from entering the combustion chamber 128 on the side of the intake port 144 nearest to the exhaust port 152 and blocks the most direct path from the intake port to the exhaust port. Accordingly, most of the intake stream enters the combustion chamber 128 on the side of the combustion chamber furthest from the exhaust port 152, as shown by the dashed arrows 196 of FIG. 5.

The exhaust skirt 180 is positioned to contact the side of the exhaust valve 140 nearest to the intake port 144 to prevent the intake stream from entering the combustion chamber 128 and flowing directly through the exhaust port 152. As a result, the intake skirt 176 and the exhaust skirt 180 establish a clockwise (with respect to FIGS. 5 and 6) intake stream flow path down the right side of the combustion chamber 128 across the top of the piston 108 and up the left side of the combustion chamber. This relatively lengthy path encourages scavenging of the exhaust by-products and also ensures that the combustion chamber 128 is at least partially filled with fresh air and unburned fuel before any of the fresh air and/or fuel is in a position to exit the combustion chamber through the exhaust port 152. Additionally, the length of the path taken by the intake stream as a result of the intake skirt 176 and the exhaust skirt 180 may reduce oil consumption of the engine 100, among other benefits.

Figure 7:
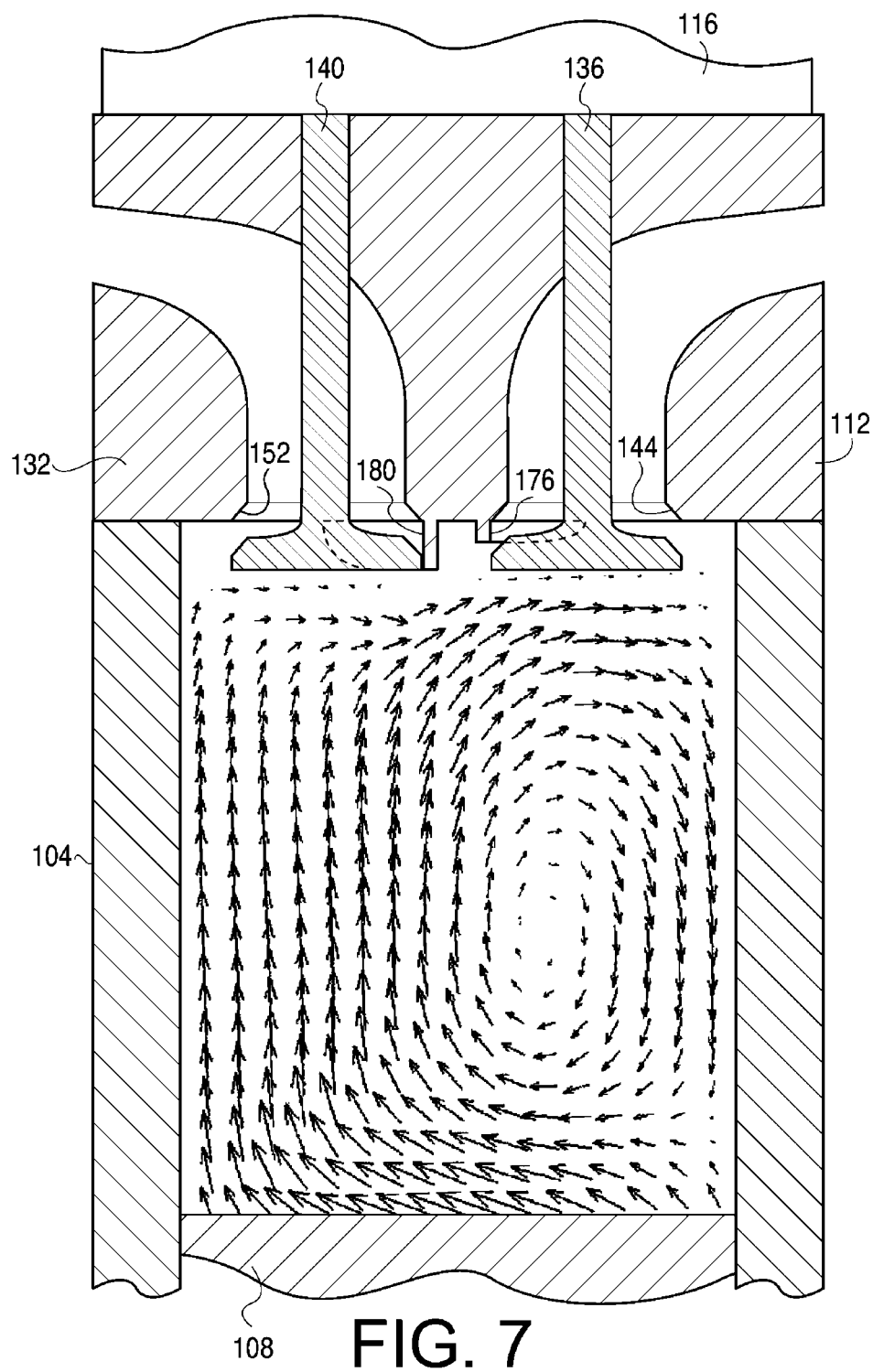
FIG. 7 is a side cross sectional view of the internal combustion engine of FIG. 1 showing the tumble of an intake stream entering the combustion chamber of the engine.

As shown in FIG. 7, the intake skirt 176 and the exhaust skirt 180 also increase the tumble of the intake stream within the combustion chamber 128. The term "tumble," as used herein, refers to the flow of the intake stream around an axis that is approximately perpendicular to the direction of valve movement 178. Although not shown in the figures, the intake skirt 176 and the exhaust skirt 180 may also increase the swirl of the intake stream within the combustion chamber 128. The term "swirl," as used herein, refers to the flow of the intake stream around an axis that is approximately parallel to the direction of valve movement 178. Increased levels of tumble and/or swirl distribute the unburned fuel more completely through the combustion chamber 128, increase the overall turbulence within the combustion chamber, and thoroughly mix the fresh air with the unburned fuel. Additionally, high levels of tumble and swirl may also assist in atomizing the unburned fuel within the combustion chamber 128, thereby resulting increased engine 100 output power and torque.

Figure 8:
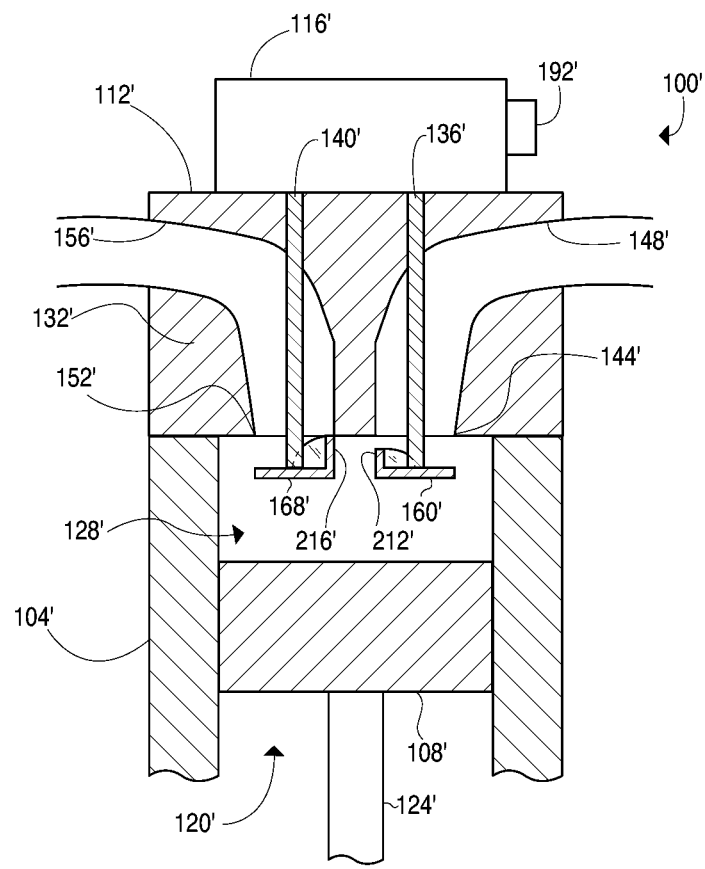
FIG. 8 is an alternative embodiment of the internal combustion engine of FIG. 1 having an intake shroud associated with the intake valve and an exhaust shroud associated with the exhaust valve.
Figure 9:
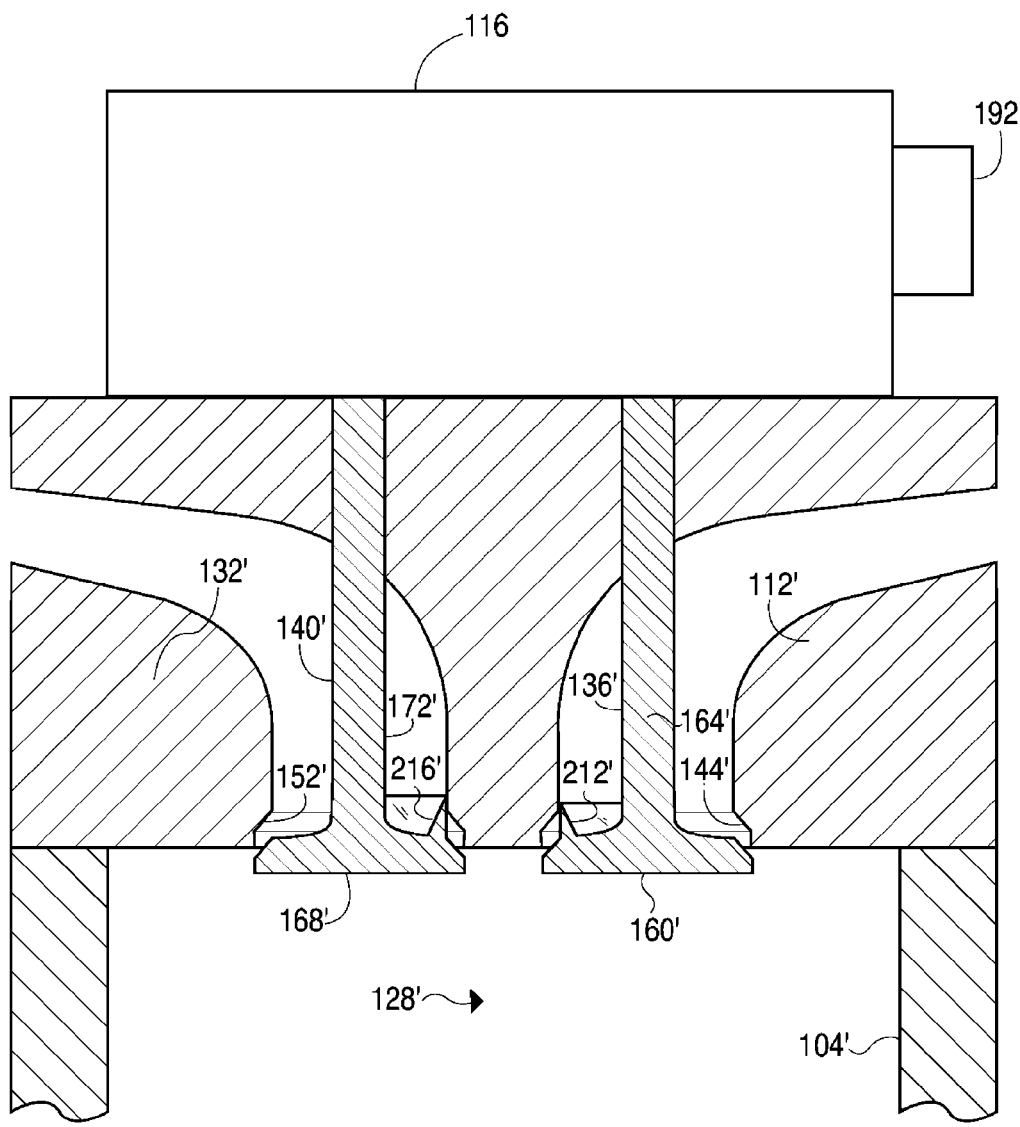
FIG. 9 is side cross sectional view of a cylinder head of the internal combustion engine shown in FIG. 8.

As shown in FIG. 8, an alternative embodiment of the engine 100' is shown with the intake valve 136' and the exhaust valve 140' in a configuration that corresponds to the valve configuration of FIG. 6 (reference point D of FIG. 3). The engine 100' of FIG. 8 includes the same components as the engine 100 of FIG. 1, except that the engine 100' includes an intake shroud 212' and an exhaust shroud 216' and does not include the intake skirt 176 and the exhaust skirt 180. The intake shroud 212' is connected to the intake valve head 160'. The intake shroud 212' extends upward from the intake valve head 160' for a distance approximately equal to the height of the intake skirt 176 (line 184, FIG. 2A). The intake shroud 212' extends around a portion of the periphery of the intake valve head 160' and has a generally arcuate shape. The intake shroud 212' may have a constant height or may have a height that decreases toward the lateral ends of the shroud. FIG. 9 illustrates a detailed view of the intake shroud 212' showing the intake valve 136' in an open position with a different lift than is shown in FIG. 8. In FIG. 9 the intake shroud 212' contacts the intake port 144' to prevent the intake stream from entering the combustion chamber 128' through the side of the intake port 144' near the exhaust port 152'. The intake shroud 212' may extend for a distance behind the intake shaft 164' as shown in FIG. 9. The intake stream may enter the combustion chamber 128' from the side of the intake port 144' opposite the exhaust port 152'. Accordingly, the intake shroud 212' contributes to the reduction in short circuiting in a manner similar to the intake skirt 176.

As shown in FIG. 9, the exhaust shroud 216' is connected to the exhaust valve head 168'. The exhaust shroud 216' extends upward from the exhaust valve head 168' for a distance approximately equal to the height of the exhaust skirt 180 (line 188, FIG. 2A). The exhaust shroud 216' extends around a portion of the periphery of the exhaust valve head 168' and has a generally arcuate profile. The exhaust shroud 216' may have a constant height or may have a height that decreases toward the lateral ends of the shroud. As shown in FIG. 8, the exhaust valve 140' is open and the exhaust shroud 216' contacts the exhaust port 152' to prevent the intake stream from flowing through the exhaust port. Accordingly, the exhaust shroud 216' contributes to the reduction in short circuiting in a manner similar to the exhaust skirt 180.

Figure 10:
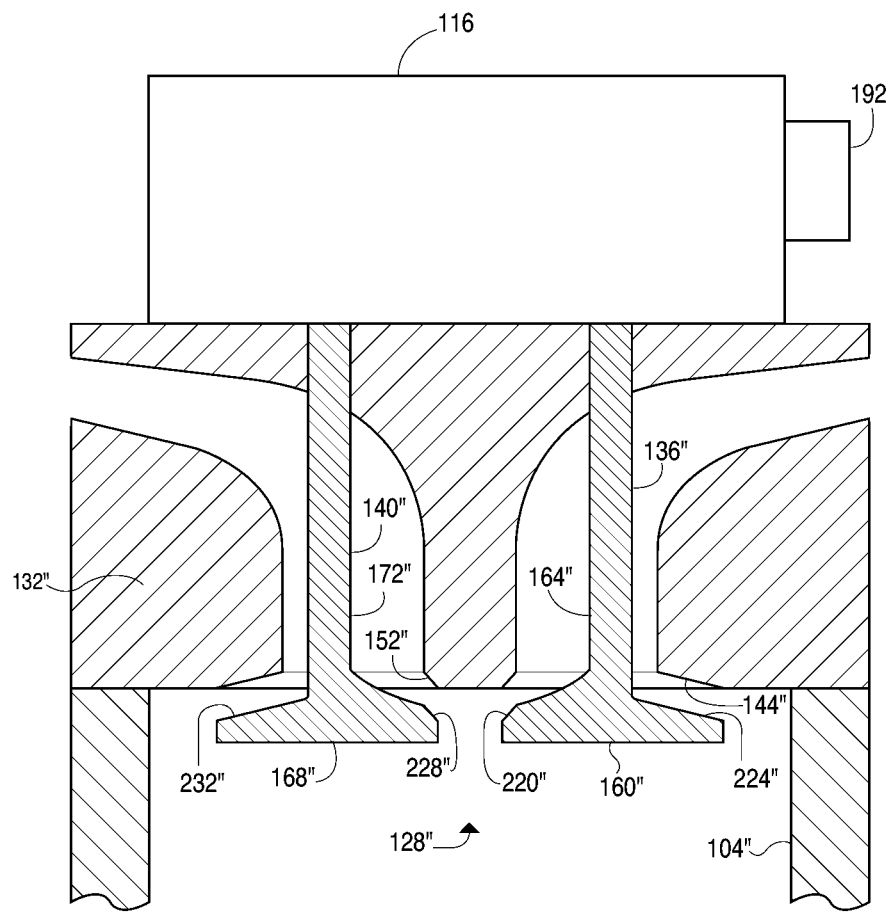
FIG. 10 is a side cross sectional view of an alternative embodiment of the cylinder head of the internal combustion engine of FIG. 1.

As shown in FIG. 10, an alternative embodiment of the intake valve 136" and the exhaust valve 140" is shown. The intake valve 136" and its associated intake port 144" may be used with the internal combustion engine 100 of FIG. 1 in place of the intake valve 136 and the intake port 144. The exhaust valve 140" and its associated exhaust port 152" may be used with the internal combustion engine 100 of FIG. 1 in place of the exhaust valve 140 and the exhaust port 152. The intake valve 136" and the exhaust valve 140" have a geometry that serves to reduce short circuiting within the combustion chamber 128". In particular, intake valve head 160" includes a steep inclined surface 220" and a shallow inclined surface 224", both of which direct the intake stream downward into the combustion chamber 128" instead of enabling the intake stream to flow laterally toward the exhaust port 152". The steep inclined surface 220" merges gradually into the shallow inclined surface 224" around the periphery of the intake valve head 160". The exhaust valve head 168" includes a steep inclined surface 228" and shallow inclined surface 232", which encourage exhaust product to flow through the exhaust port 152" on the side of the exhaust port nearest to the shallow inclined surface.

Although the exhaust valve head 168 and the intake valve head 160 are illustrated in FIG. 1 as being similarly sized, in other embodiments, the exhaust valve head and the intake valve head may have different dimensions. For example, the exhaust valve head 168 may have a diameter 1.5 times larger than a diameter of the intake valve head 160. The exhaust valve 140 and the intake valve 136 may be referred to as poppet valves.

The device described herein has been illustrated and described in detail in the figures and foregoing description, the same should be considered as illustrative and not restrictive in character. It is understood that only the preferred embodiments have been presented and that all changes, modifications, and further applications that come within the spirit of the device described herein are desired to be protected.

What is claimed is:

1. A method of operating an internal combustion engine having a piston comprising:
    moving an exhaust valve to a first open position during a stroke of the piston to enable an exhaust product to flow through an exhaust port of the internal combustion engine;
    moving the exhaust valve to a second open position, during the same stroke of the piston;
    maintaining the exhaust valve at the second open position for a predetermined time period; and
    moving an intake valve to a third open position during the predetermined time period to enable an intake product to flow through an intake port of the internal combustion engine,
    wherein a lift of the exhaust valve at the first open position is greater than a lift of the exhaust valve at the second open position.

2. The method of claim 1 wherein the lift of the exhaust valve at the second open position is substantially equal to a lift of the intake valve at the third open position.

3. The method of claim 2 further comprising:
    moving the intake valve to a first closed position after positioning the intake valve in the third open position; and
    moving the exhaust valve to a second closed position after moving the intake valve to the first closed position.

4. The method of claim 3 further comprising moving the intake valve toward the third open position before the predetermined time period.

5. The method of claim 4 further comprising initiating movement of the intake valve toward the third open position in response to the exhaust valve arriving at the first open position.

6. The method of claim 1 further comprising:
    preventing at least a portion of the intake product from flowing through the exhaust port during the predetermined time period with a first at least one blocking member.

7. The method of claim 6 wherein:
    the at least one blocking member includes a first blocking member and a second blocking member,
    the first blocking member is a first skirt associated with the exhaust port,
    the first skirt has a height substantially equal to the lift of the exhaust valve at the second open position,
    the second blocking member is a second skirt associated with the intake port, and
    the second skirt has a height less than the height of the first skirt.

8. The method of claim 7, wherein the first skirt has a height substantially equal to a lift of the intake valve at the third open position.

9. The method of claim 1 further comprising:
    operating the internal combustion engine in a four-stroke mode with a first valve positioning sequence;
    adjusting a selection member to operate the internal combustion engine in a two-stroke mode; and
    operating the internal combustion engine in the two-stroke mode with a second valve positioning sequence,
    wherein only one of the first valve positioning and the second valve positioning sequence includes maintaining the exhaust valve at the second open position for the predetermined time period.

10. The method of claim 1, wherein:
    the stroke of the piston is a first stroke,
    a second stroke of the piston occurs immediately after the first stroke, and
    the predetermined time period begins during the first stroke and ends during the second stroke.

11. An internal combustion engine comprising:
    an exhaust valve configured to move to a first open position to enable an exhaust product to flow through an exhaust port of the internal combustion engine;
    an intake valve configured to move to a second open position to enable an intake product to flow through an intake port of the internal combustion engine; and
    a valve controller configured (i) to position the exhaust valve at the first open position during a stroke of a piston of the internal combustion engine, (ii) to position the exhaust valve at the second open position, during the same stroke of the piston, (iii) to maintain the exhaust valve at the second open position for a predetermined time period, and (iv) to move the intake valve to a third open position during the predetermined time period,
    wherein a lift of the exhaust valve at the first open position is greater than a lift of the exhaust valve at the second open position.

12. The internal combustion engine of claim 11 further comprising:
    a first shroud connected to the exhaust valve,
    wherein the first shroud is configured and arranged to prevent at least a portion of the intake product from flowing through the exhaust port.

13. The internal combustion engine of claim 12 further comprising:
    a second shroud connected to the intake valve,
    wherein the second shroud is configured and arranged to prevent the portion of the intake product from flowing through the exhaust port.

14. The internal combustion engine of claim 11 further comprising:
    a first skirt connected to a ceiling of a combustion chamber of the internal combustion engine,
    wherein the first skirt is configured and arranged to prevent the portion of the intake product from flowing through the exhaust port.

15. The internal combustion engine of claim 14 further comprising:
    a second skirt connected to the ceiling of the combustion chamber of the internal combustion engine,
    wherein the second skirt has a height less than the height of the first skirt.

16. A method of operating an internal combustion engine comprising:
    moving an exhaust valve to a first open position to enable an exhaust product to flow through an exhaust port of the internal combustion engine;

moving the exhaust valve to a second open position, a lift of the exhaust valve at the first open position being greater than a lift of the exhaust valve at the second open position; and moving an intake valve to a third open position to enable an intake product to flow through an intake port of the internal combustion engine, a lift of the intake valve at the third open position always being less than the lift of the exhaust valve at the first open position.

17. The method of claim 16, wherein the lift of the intake valve at the third open position is always less than or equal to the lift of the exhaust valve at the second position.

18. The method of claim 16, wherein:

the exhaust valve is moved to the first open position during a stroke of a piston of the internal combustion engine, and the exhaust valve is moved to the second open position during the same stroke of the piston.

19. The method of claim 16, further comprising:

maintaining the exhaust valve at the second open position for a predetermined time period.

20. The method of claim 16, further comprising:

preventing at least a portion of the intake product from flowing through the exhaust port with a first blocking member associated with the intake port; and preventing at least the portion of the intake product from flowing through the exhaust port with a second blocking member associated with the exhaust port.

* * * * *